Feb. 23, 1971     J. V. FISHER     3,565,499
HEADLAMP BUSHING
Filed Aug. 12, 1969
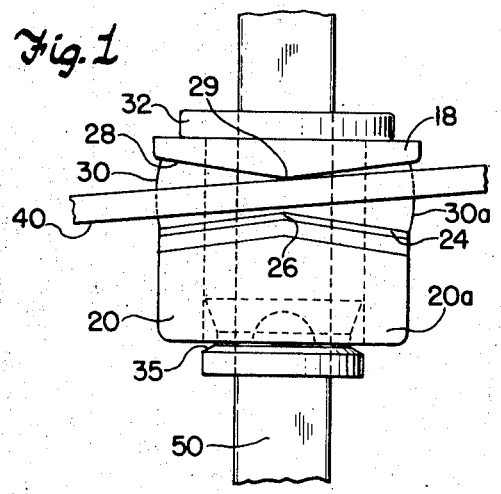
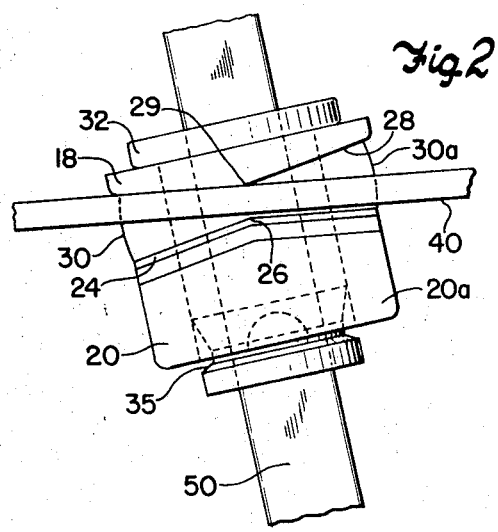
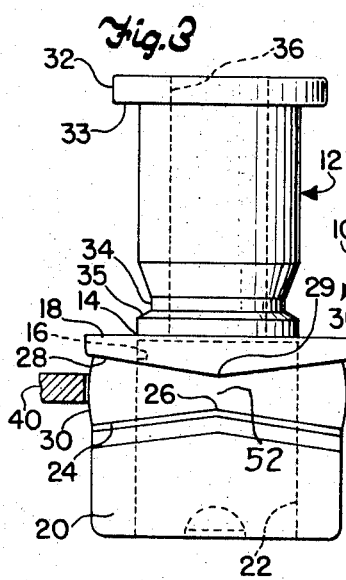
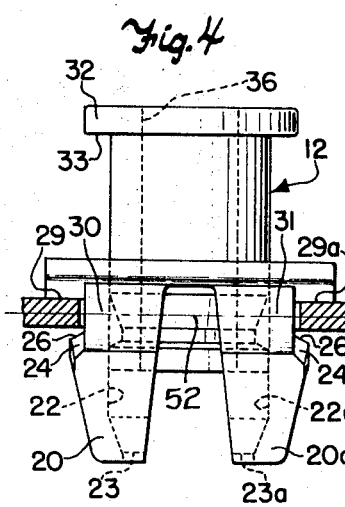
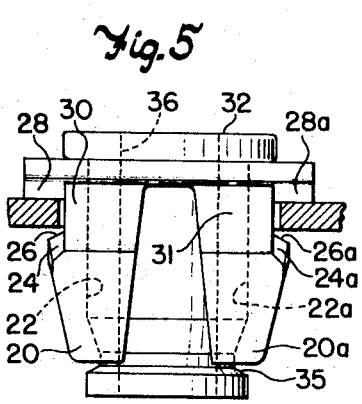
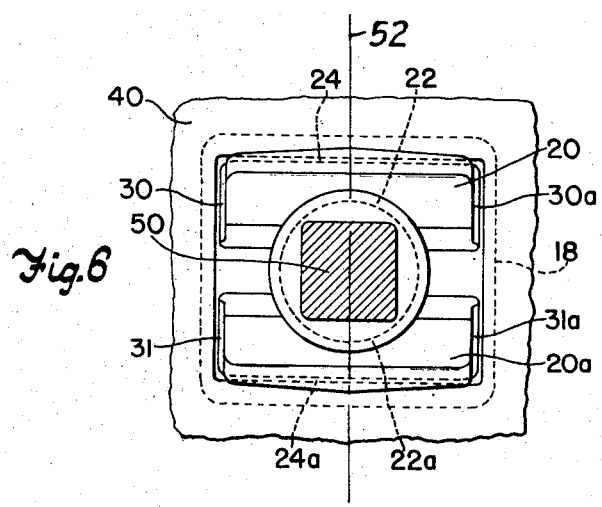
INVENTOR.
Julian V. Fisher
BY
His Att'ys United States Patent Office 3,565,499
Patented Feb. 23, 1971

3,565,499
HEADLAMP BUSHING
Julian V. Fisher, Carpentersville, Ill., assignor to Illinois Tool Works Inc., Chicago, Ill., a corporation of Delaware
Filed Aug. 12, 1969, Ser. No. 849,405
Int. Cl. F16c 11/06
U.S. Cl. 308—237
9 Claims

ABSTRACT OF THE DISCLOSURE

An initially integral shaft or rod mounting bushing assembly to be attached to an apertured support panel and including a hollow drive pin having a shearable connection to a grommet with a head portion presenting shoulder surfaces to engage the accessible face of the panel and spaced prongs to be snapped through the panel aperture and presenting shoulder surfaces to engage the blind face of the panel; the shoulder surfaces being relatively disposed to permit relative adjustment between the panel and the bushing assembly along at least one axis included in the plane of the panel and with spherical surfaces joining the outer edges of opposed shoulder surfaces to snug the bushing in the panel aperture in all positions of relative adjustment therebetween. The drive pin is driven into the space between the grommet prongs to have an interlocking snap engagement with the inner ends thereof maintaining the outward spreading thereof for mounting the bushing in the panel aperture and with the drive pin receiving therethrough a shaft or rod for manipulation to operate some remotely situated mechanism, such as headlight shutters or other mechanisms.

The invention is concerned with a bushing assembly to be mounted in an apertured panel for passing therethrough a rod or shaft to be actuated from one side of the panel for operating a controlled device on the opposite side of the panel and usually somewhat remote therefrom. With this in mind, the disclosure contemplates initial molding of the bushing from plastic material to include a grommet portion and a hollow drive pin joined to the grommet head by a shearable connection positioning the drive pin in axially projected alignment with the space between two prongs extruding in the opposite direction away from the grommet head. The prongs present a rectangular or square outline for passage through a similarly shaped panel aperture during which passage the prongs are slightly collapsed toward one another and are then sprung outwardly presenting shoulder surfaces behind the blind face of the panel to prevent removal. The head of the body or grommet presents shoulder surfaces at the opposite face of the panel limiting inward movement relative thereto. A hollow drive pin initially extends axially from the head oppositely to the prongs. In this position the pin has a shearable connection with the head around a central opening therethrough and the confronting surfaces of the spaced prongs are complementally shaped to snugly receive the outer surface of the drive pin as it is driven inwardly therebetween to maintain or enlarge the spread positions of the prongs and to interlock with the inner ends thereof. When so assembled, the hollow drive pin provides a mounting for an operating rod or shaft passed therethrough to control a remotely situated device.

An object of the invention is to provide a bushing assembly which permits adjustment in the mounted position relative to the panel, thus to afford self-alignment thereof and the operating rod extending therethrough.

Another object of the invention is to relatively orient the head and prong shoulder surfaces to permit such adjustment at least along one axis included in the plane of the panel and at the same time maintain snugness of the bushing assembly against movement along the panel by presenting between the outer ends of the shoulder surfaces curved edge portions engaging adjacent surfaces of the panel aperture.

Another object of the invention is to provide a bushing assembly which may be conveniently molded as an initially integral unit from plastic material with self-lubricating properties facilitating push-pull or rotation of the operating rod or shaft.

A still further object of the invention is to provide for rotation of a shaft of square or other out-of-round cross section by complementally shaping the inner surface of the opening through the drive pin with the outer surface thereof circular permitting rotation thereof and the included shaft as a unit within the grommet or body.

In the accompanying drawing:

FIG. 1 is a plan view showing one position of relative adjustment between the bushing assembly and the support panel;

FIG. 2 is a similar view showing another permissive position of relative adjustment between the bushing assembly and the support panel;

FIG. 3 is a plan view of the initially formed bushing assembly with the prongs passed through the panel aperture;

FIG. 4 is a similar view showing the drive pin initially driven between the prongs breaking its shearable connection with the grommet head;

FIG. 5 is a similar view showing the driven position of the drive pin in the bushing assembly; and FIG. 6 is an end view of the driven position of the drive pin with an included square shaft in section.

Referring more in detail to the accompanying drawing, and particularly to FIGS. 3–6, the bushing assembly includes a grommet or body portion 10 and a hollow drive pin 12 integral therewith initially through a shearable connection 14 around a circular opening 16 in the grommet head 18, thus initially positioning the drive pin as shown in FIG. 3. The grommet includes spaced rectangular prongs 20, 20a projecting from this head 18 in a direction opposite to that of the drive pin 10. The confronting inner surfaces of each prong are provided with arcuate recesses 22, 22a forming continuations of corresponding portions of the circular opening 16 in the head but inclined inwardly at the free ends to provide locking shoulder formations 23, 23a to be hereinafter described. Tapered surface shoulders 24, 24a extend lengthwise of the outer surface of each prong 20, 20a, respectively, adjacent the upper ends thereof and spaced from the head 18. These shoulders constitute a ledge inclining from central apices 26, 26a away from the head 18 which is provided with similar shoulder ledges 28, 28a inclined in the opposite direction from central apices 29, 29a, respectively. Opposite ends 30, 30a, 31, 31a of each prong 20, 20a, respectively, between the outer ends of the shoulder ledges thereon and the outer ends of the shoulder ledges on the head are arcuate along centers disposed substantially centrally between the corresponding apices on the head and prongs.

The hollow drive pin 12 is provided with a cylindrical outer surface complementing the opening 16 in the head and the recesses 22, 22a in the prongs and the outer end thereof terminates in a flange 32 presenting an inward shoulder surface 33. Adjacent the shearable connection 14, the drive pin is annularly recessed, as at 34, to present a shoulder surface 35 to cooperate with the shoulder formations 23, 23a as hereinafter pointed out. The internal configuration of the opening 36 through the drive pin may vary from cylindrical to take a cylindrical shaft or rod to out-of-round, square as illustrated, to take a similarly shaped rod or shaft to be operated by push-pull or rotation.

The support panel 40 is provided with an aperture 42 shaped to complement the rectangular, square or other out-of-round outline configuration of the prongs 20, 20a so as to prevent rotation of the grommet portion of the assembly after mounting in the panel. With reference to FIG. 3, the bushing assembly is shown as initially positioned with the prongs 20, 20a snapped through the panel aperture 42 with the prong shoulders facing the blind side of the panel and with the head shoulders facing the accessible side of the panel. The drive pin 12 is then driven inwardly to break the shearable connection 14 and progressively pass through positions, such as FIG. 4, to the driven position of FIG. 5 with the flange surface 33 abutting the head 18 and with the shoulder formations 23, 23a on the prongs snapping behind the shoulder surface 35 on the drive pin to interlock the pin and grommet and maintain the prong shoulder surfaces spread to lie in interfering position against removal of the assembly from the panel. When the drive pin and grommet are so interlocked, the curved surfaces 30, 30a and 31, 31a, on the prongs 23, 23a, respectively, are in substantially confining contact with adjacent surfaces of the panel aperture 42 to prevent any appreciable movement of the assembly along the panel even when the assembly assumes various positions of angular adjustment relative the panel as illustrated in FIGS. 1 and 2. The opening 36 in the drive pin receives a complementally shaped rod or shaft 50 for push-pull or rotary operation and the plastic material may be nylon or Teflon for self-lubricating properties. If the opening and shaft are cylindrical, the shaft may rotate in the drive pin. With the illustrated shaft of square cross section, the outer surface of the drive pin is cylindrical so that rotation of the shaft is permitted by rotation of the drive pin therewith in the grommet and here again the self-lubricating properties of the bushing material come into play.

With reference to FIGS. 1 and 2, permissive positions of relative adjustment are shown between the panel and the bushing assembly with the included shaft for proper self-alignment of the shaft between the ends thereof. The distance between the shoulder apices 29, 26 and 29a, 26a on the head and prongs, respectively, approximates the thickness of the support panel to prevent excessive play although minor adjustment inclinations along the apices may be permitted. The principal adjustment is along the axis 52 including the centers of curvature of the curved surfaces on the prongs and to this end the inclination of the head and prong shoulder surfaces from the apices may approximate eight degrees to the plane of the panel. In FIG. 1 there is illustrated an intermediate position of relative adjustment between the bushing assembly and the panel and FIG. 2 illustrates one extreme position of such relative adjustment with the left half of the head shoulders 28, 28a abutting the panel. In all positions of permissive adjustment, the curved surfaces on the prongs approximate the adjacent edges of the panel aperture as do the longitudinal outer edges of the prongs, thus to snug the bushing assembly in the panel aperture.

What is claimed is:

1. A bushing assembly to be attached in a panel aperture for supporting a control shaft passing therethrough, and comprising a grommet type body portion including an apertured head portion to overlie the outer face of the panel around the aperture therethrough, and spaced prongs projecting from the head in the direction to be passed through the panel aperture and complementally shaped with the panel aperture to prevent rotation of the body portion in the panel aperture when installed, opposed shoulder means on said head portion and said prongs engageable, respectively, with opposite faces of the panel to trap the body portion in the panel aperture and being relatively divergent from central apical portions to permit relative angular adjustment between the body portion and the panel, and surface means within said prongs for receiving and supporting a control shaft passing therethrough and through the head portion aperture.

2. A bushing assembly as claimed in claim 1, wherein the apical portions are spaced from one another substantially the thickness of the panel with the permissive angular adjustment being about an axis substantially intermediate the said apical portions and parallel thereto.

3. A bushing assembly as claimed in claim 2, wherein the ends of the prongs between the divergent ends of the shoulder means are curved substantially about said axis as a center to remain in confining relation with adjacent edges of the panel aperture during all positions of adjustment.

4. A bushing assembly as claimed in claim 1, wherein the shoulder means comprises a pair of elongate shoulder surfaces on said head and a similar elongate shoulder surface on each prong with the ends of the prongs between the divergent ends of the shoulder surfaces thereon and on said head being curved to snug adjacent surfaces of the panel aperture in the various positions of relative adjustment.

5. A bushing assembly as claimed in claim 1, wherein the shaft supporting surface means comprises a pin positioned within said prongs and the aperture in said head portion and having an opening therethrough to receive the control shaft.

6. A bushing assembly as claimed in claim 5, wherein the opening through the pin is non-circular to receive a complementally shaped control shaft with the outer surface of the pin cylindrical permitting rotation of the pin with rotation of the shaft.

7. A bushing assembly as claimed in claim 1, wherein the shaft supporting surface means comprises a drive pin externally shaped in complement to the aperture in the head portion with one end initially secured to the head portion around the aperture therethrough by a shearable connection spacing the opposite end of the drive pin remote from the head portion and said prongs permitting driving of the drive pin to break the shearable connection and position the drive pin within said prongs maintaining the shoulder means on the prongs in position to prevent removal of the assembly from the panel.

8. A bushing assembly as claimed in claim 7, wherein the edge portions of the prongs adjacent the head portion are curved about a center substantially intermediate the apical portions to snug the adjacent edges of the panel aperture in all positions of permissive adjustment.

9. A bushing assembly as claimed in claim 8, wherein the opening through the drive pin is non-circular to receive a similarly shaped shaft and wherein the outer surface of the drive pin is cylindrical to mate with similar inner surfaces in the aperture of the head portion and the prongs permitting rotation of the drive pin with rotation of the included shaft.

References Cited

UNITED STATES PATENTS 2,170,718   8/1939   Humphries _____ 16—2UX
2,393,606   1/1946   Brush _____ 85—84

FRED C. MATTERN, Jr., Primary Examiner

R. H. LAZARUS, Assistant Examiner